US008248337B2

(12) United States Patent
Takeuchi et al.

(10) Patent No.: US 8,248,337 B2
(45) Date of Patent: Aug. 21, 2012

(54) VIDEO SIGNAL PROCESSING METHOD, VIDEO SIGNAL PROCESSING APPARATUS, AND DISPLAY APPARATUS

(75) Inventors: Masakazu Takeuchi, Matsusaka (JP); Akihisa Iwamoto, Urayasu (JP); Hideki Morii, Tsu (JP); Takayuki Mizunaga, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1050 days.

(21) Appl. No.: 11/921,402

(22) PCT Filed: May 19, 2006

(86) PCT No.: PCT/JP2006/310058

§ 371 (c)(1), (2), (4) Date: Nov. 30, 2007

(87) PCT Pub. No.: WO2006/132069

PCT Pub. Date: Dec. 14, 2006

(65) Prior Publication Data

US 2009/0115910 A1 May 7, 2009

(30) Foreign Application Priority Data

Jun. 9, 2005 (JP) ................................ 2005-170156

(51) Int. Cl.
*G09G 3/36* (2006.01)

(52) U.S. Cl. ................ 345/87; 345/88; 345/89; 345/98; 345/530

(58) Field of Classification Search .................... 345/77, 345/87, 89, 98, 530
See application file for complete search history.

(56) References Cited

U.S. PATENT DOCUMENTS

| | | | | |
|---|---|---|---|---|
| 5,175,621 | A * | 12/1992 | Maesato | 348/676 |
| 5,838,389 | A * | 11/1998 | Mical et al. | 348/650 |
| 7,015,928 | B2 * | 3/2006 | MacInnis et al. | 345/601 |
| 2001/0026283 | A1 | 10/2001 | Yoshida et al. | |
| 2004/0257888 | A1 * | 12/2004 | Noguchi et al. | 365/200 |
| 2005/0073525 | A1 * | 4/2005 | Chao et al. | 345/531 |

FOREIGN PATENT DOCUMENTS

| | | |
|---|---|---|
| JP | 61-280174 | 12/1986 |
| JP | 05-67203 | 3/1993 |
| JP | 08-237519 | 9/1996 |
| JP | 2001-337667 | 12/2001 |
| JP | 2003-150948 | 5/2003 |

* cited by examiner

*Primary Examiner* — William Boddie
*Assistant Examiner* — Sahlu Okebato
(74) *Attorney, Agent, or Firm* — Harness, Dickey & Pierce, P.L.C.

(57) ABSTRACT

In one embodiment of the present invention, a video signal processing method is disclosed wherein video correction data is read from a ROM and written into an LUT, and the video correction data written in the LUT is used to perform data correction of an externally inputted video signal. The video correction data written in the LUT is updated during the horizontal blanking interval of the video signal.

13 Claims, 10 Drawing Sheets

(a) Video data
(b) First control signal
(c) Second control signal
Vertical blanking interval
Display interval
Horizontal blanking interval
Display interval
Horizontal blanking interval
Display interval
Vertical blanking interval
Display interval
t1
t2
t3
t4
t5
t6
t7

Data operation section
1
LUT
2
LOAD2
Loading buffer
3
LOAD1
ROM
8

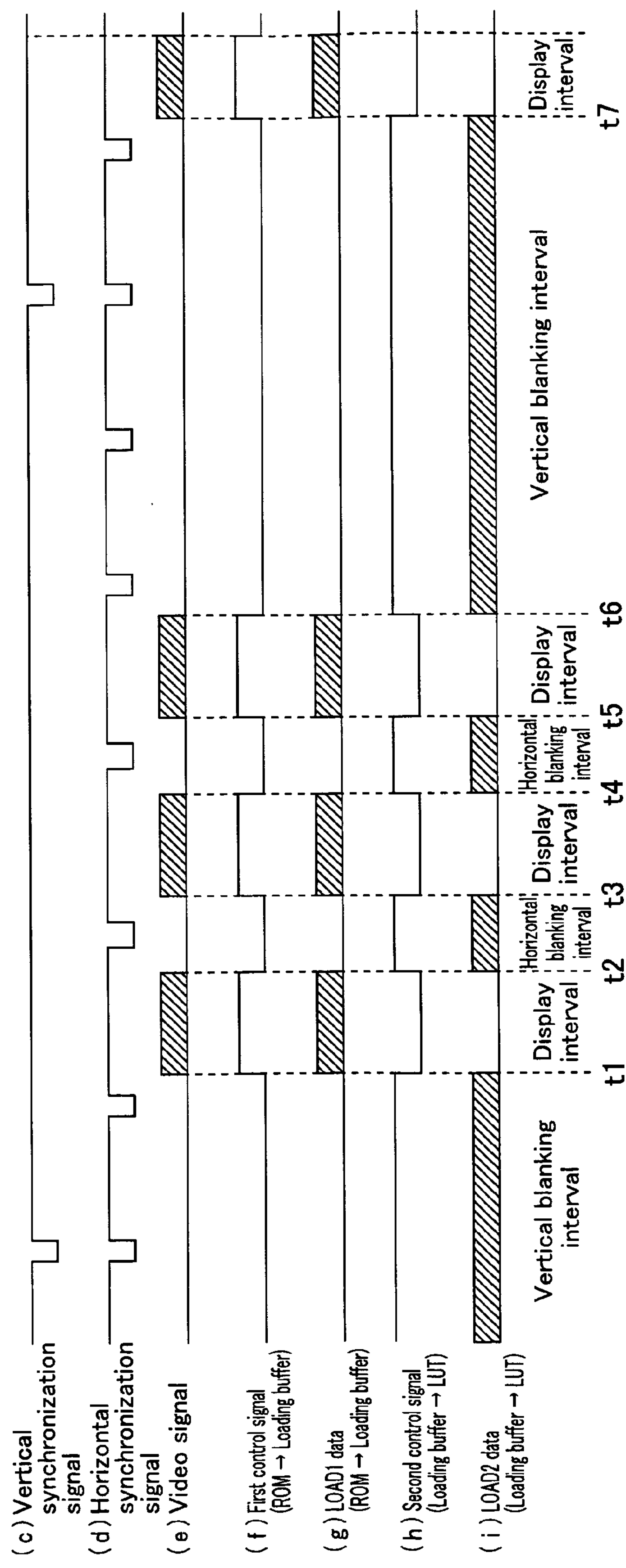

FIG. 2
(c) Vertical synchronization signal
(d) Horizontal synchronization signal
(e) Video signal
(f) First control signal (ROM → Loading buffer)
(g) LOAD1 data (ROM → Loading buffer)
(h) Second control signal (Loading buffer → LUT)
(i) LOAD2 data (Loading buffer → LUT)
Vertical blanking interval
Display interval
Horizontal blanking interval
Display interval
Horizontal blanking interval
Display interval
Vertical blanking interval
Display interval
t1
t2
t3
t4
t5
t6
t7

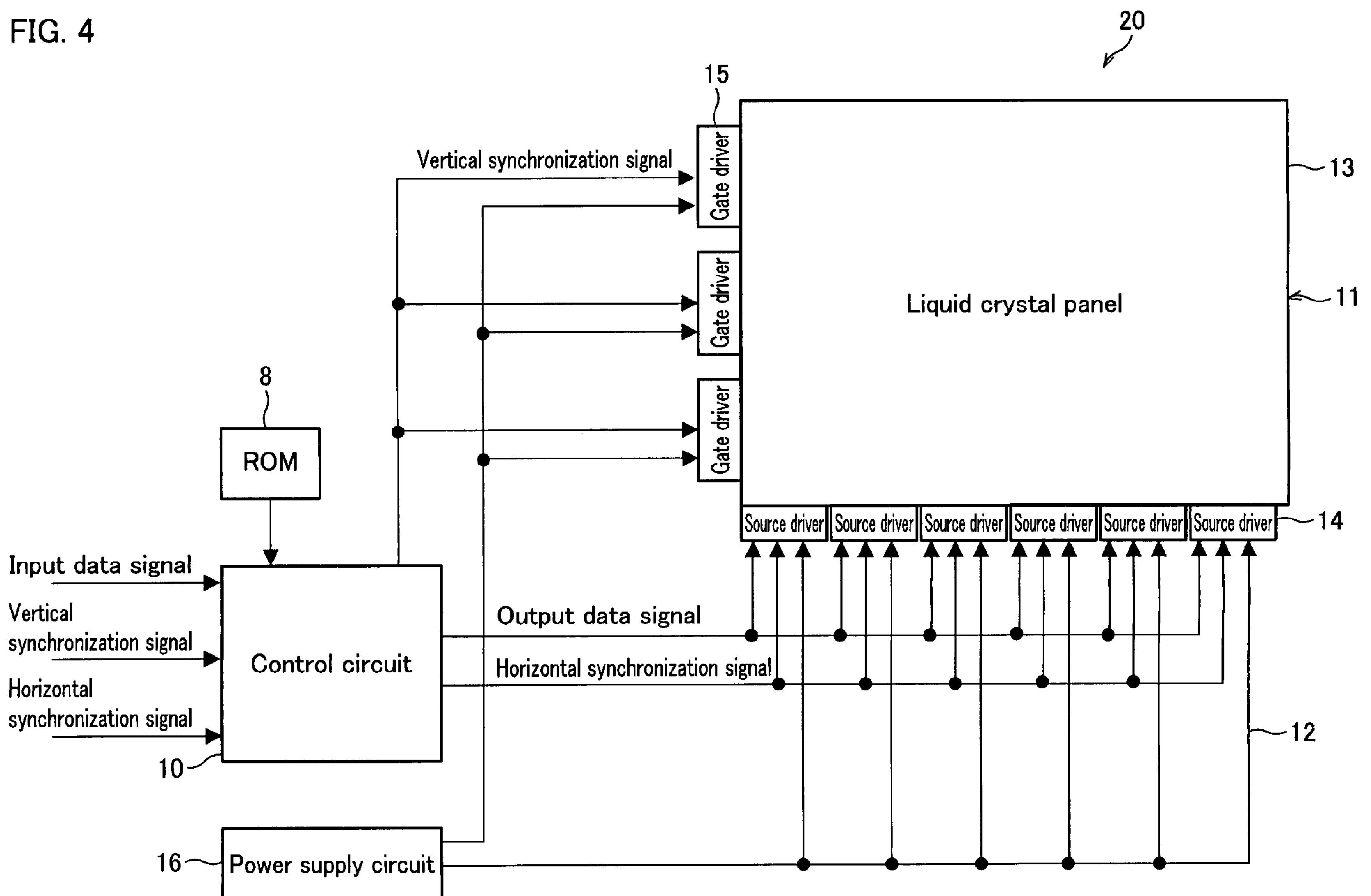
FIG. 4
20
15
Vertical synchronization signal
Gate driver
Gate driver
Gate driver
13
11
Liquid crystal panel
8
ROM
Source driver
Source driver
Source driver
Source driver
Source driver
Source driver
14
Input data signal
Vertical
synchronization signal
Control circuit
Output data signal
Horizontal synchronization signal
Horizontal
synchronization signal
10
12
16
Power supply circuit (j) Video data
(k) Third control signal
Vertical blanking interval
Display interval
Horizontal blanking interval
Display interval
Horizontal blanking interval
Display interval
Vertical blanking interval
Display interval
t11
t12
t13
t14
t15
t16
t17

Data operation section
1
LUT
2
LOAD3
ROM
3

(l) Vertical synchronization signal
(m) Horizontal synchronization signal
(n) Video data
(o) Third control signal (ROM → LUT)
(p) LOAD3 data (ROM → LUT)
Vertical blanking interval
Display interval
Horizontal blanking interval
Display interval
Horizontal blanking interval
Display interval
Vertical blanking interval
Display interval
t11
t12
t13
t14
t15
t16
t17

PRIOR ART

VIDEO SIGNAL PROCESSING METHOD, VIDEO SIGNAL PROCESSING APPARATUS, AND DISPLAY APPARATUS

TECHNICAL FIELD

The present invention relates to a video signal processing method for video correction data stored in a lookup table, a video signal processing apparatus, and display apparatus.

BACKGROUND ART

Liquid crystal display apparatuses utilize video data to display images on a liquid crystal display section. The video data is corrected through data correction such as gamma correction on the control circuit of the liquid crystal display apparatus. A lookup table (LUT) is generally utilized for the data correction. In many cases, LUT is a RAM, which is rewritable, in order that parameters in the LUT may be changed according to different data correction. In this arrangement, video correction data stored in an external ROM in advance is transferred to the LUT before display.

However, the liquid crystal display apparatuses of this arrangement would suffer from destruction of data in the LUT due to noise due to static electricity, etc. during display. Destroyed data in the LUT makes it impossible to perform intended data processing.

As a solution, a method in which the ROM refreshes the LUT in order to restore the destroyed data in the LUT has been already disclosed. This method is described below with reference to FIGS. 9 and 10. This method is, for instance, shown in Japanese Unexamined Patent Publication No. 237519/1996 (Tokukaihei 8-237519 (Date of publication: Sep. 13, 1996)).

FIG. 9 illustrates a control circuit which corrects the video data in conventional liquid crystal display apparatus. The control circuit comprises a data operation section 80, an LUT 81, and a ROM 82 as illustrated in FIG. 9.

Video correction data whose content is identical to that of the data stored in the LUT 81 is stored in the ROM 82 in advance. An input data signal externally inputted into the data operation section 80 is corrected and then outputted as an output data signal.

The LUT 81 communicates with the data operation section 80 during display intervals. Video correction data whose content is identical to that of the data stored in the LUT 81 is stored in the LUT 82 in advance. The video correction data is transferred from the ROM 82 to the LUT 2 to update (refresh) the video correction data in the LUT 2 during vertical blanking intervals.

The timing for video data correction utilizing the control circuit in FIG. 9 is described below with reference to the timing diagram of FIG. 10. In this diagram: t51-t52, t53-t54, and t55-t56 are the display intervals; t52-53 and t54-t55 are horizontal blanking intervals; and t56-t57 is a vertical blanking interval.

During the display intervals on the waveform (x), the data operation section 80 communicates with the LUT 81. Corrected video data is subsequently outputted through the data operation section 80. Intervals other than the display intervals are blanking intervals: the horizontal blanking intervals and the vertical blanking intervals. As the waveform (x) indicates, a blanking interval and a display interval alternate.

Control signal (sixth control signal) between the ROM 82 and the LUT 81, as the waveform (y) indicates, is at 'L' level during the vertical blanking intervals while the control signal is at 'H' level during the display intervals and the horizontal blanking intervals.

Specifically, as indicated by the waveform (x), shifting from the vertical blanking interval to the display interval occurs at the time t51. The access from the data operation section 80 to the LUT 81 is turned on upon shifting the vertical blanking interval to the display interval. At the same time, as the waveform (y) indicates, the sixth control signal rises to 'H' level. At the time t52, as the waveform (x) indicates, the access from the data operation section 80 to the LUT 81 is turned off upon shifting the display interval to the horizontal blanking interval. At this point, as the waveform (y) indicates, the sixth control signal remains at 'H' level. At the time t53, as the waveform (x) indicates, the access from the data operation section 80 to the LUT 81 is turned on upon shifting the horizontal blanking interval to the display interval. At this point, as the waveform (y) indicates, the sixth control signal remains at 'H' level.

Shifting the display interval to the horizontal blanking interval occurs at the time t54, as indicated by the waveform (x). The access from the data operation section 80 to the LUT 81 is turned off upon shifting the display interval to the horizontal blanking interval. At this point, as the waveform (y) indicates, the sixth control signal remains at 'H' level. At the time t55, as the waveform (x) indicates, the access from the data operation section 80 to LUT 81 is turned on upon shifting the horizontal blanking interval to the display interval. At this point, as the waveform (y) indicates, the sixth control signal remains at 'H' level. At the time t56, as the waveform (x) indicates; shifting the display interval to the vertical blanking interval occurs. The access from the data operation section 80 to the LUT 81 is turned off upon shifting the display interval to the vertical blanking interval. At the same time, as the waveform (y) indicates, the sixth control signal falls to 'L' level.

Only during the vertical blanking intervals, the video correction data is transferred from the ROM 82 to the LUT 81. In other words, the video correction data in the LUT 81 is updated (rewritten, refreshed) during every vertical blanking interval. Therefore, the control circuit can normally correct video data even if the data in the LUT 81 is destroyed due to noise due to static electricity.

DISCLOSURE OF INVENTION

However, the method in Japanese Unexamined Patent Publication above has a problem of the insufficient restoration of the video correction data in the LUT 81.

That is to say, the video correction data in the LUT 81 is not updated between vertical blanking intervals because the video correction data is transferred from the ROM 82 to the LUT 81 during every vertical blanking interval according to the patent document 1 above. Accordingly, there has been a problem that the time lag in the updates of the video correction data causes defects in display images.

The present invention is aiming at solving the problem above. An object of the present invention is, for sufficient updates to the video correction data stored in the LUT, to provide a video signal processing method and a video signal processing apparatus.

To attain the object, a video signal processing method of the present invention including: reading out image correction data from a storage section; storing the image correction data in the lookup table; and performing data correction of externally imputed image signal with the image correction data stored in the lookup table includes updating the video correction data stored in the lookup table during a horizontal blanking interval of the video signal.

A video signal processing apparatus of the present invention includes: a storage section for storing video correction data for data correction of an input video signal inputted in the video signal processing apparatus externally; a lookup table for storing the video correction data transferred from the storage section; a data processing section for correcting the input video signal by using the video correction data stored in the lookup table; and a controlling section for updating during a horizontal blanking interval of the video signal.

The data processing section perform data correction to input video signals inputted therein from outside. The video correction data for the data correction is stored in the lookup table. That is to say, the data processing section and the lookup table communicate with each other for data correction of video signals.

However, the stored video correction data would be damaged due to noise due to static electricity because the lookup table is a sort of RAM, which is accessed at a high speed. The storage section is included to avoid this. That is to say, video correction data which is identical to the video correction data stored in the lookup table is stored in the storage section. The controlling section subsequently transfers the video correction data from the storage section to the lookup table to update the video correction data in the lookup table.

As described above, the video correction data stored in the lookup table is updated only during the vertical blanking intervals in conventional methods. Accordingly, the video correction data in the lookup table is never updated between the vertical blanking intervals in the conventional methods. As a result, the absence of proper data correction to the video signals causes defects in display images in case the video correction data in the lookup table is destroyed.

As a solution, the video correction data stored in the lookup table is updated during the horizontal blanking intervals according to the video signal processing method and the video signal processing apparatus of the present invention. More frequent updates to the video correction data stored in the lookup table are realized because the horizontal blanking intervals are more frequent than the vertical blanking intervals. As a result, proper display is achieved.

Additional objects, advantages and novel features of the invention will be set forth in part in the description which follows, and in part will become apparent to those skilled in the art upon examination of the following or may be learned by practice of the invention.

BRIEF DESCRIPTION OF DRAWINGS

FIG. 1(*b*) is a block diagram of ASIC and a ROM of the present invention.

FIG. 2 is a timing diagram illustrating FIG. 1(*a*) in further detail.

FIG. 4 is an explanatory view schematically illustrating a liquid crystal display apparatus of the present invention.

FIG. 6(*b*) is a block diagram of an arrangement of ASIC and a ROM, the arrangement being identical with that in FIG. 1(*b*) except that the loading buffer is not included therein.

BEST MODE FOR CARRYING OUT THE INVENTION

Figure 1:
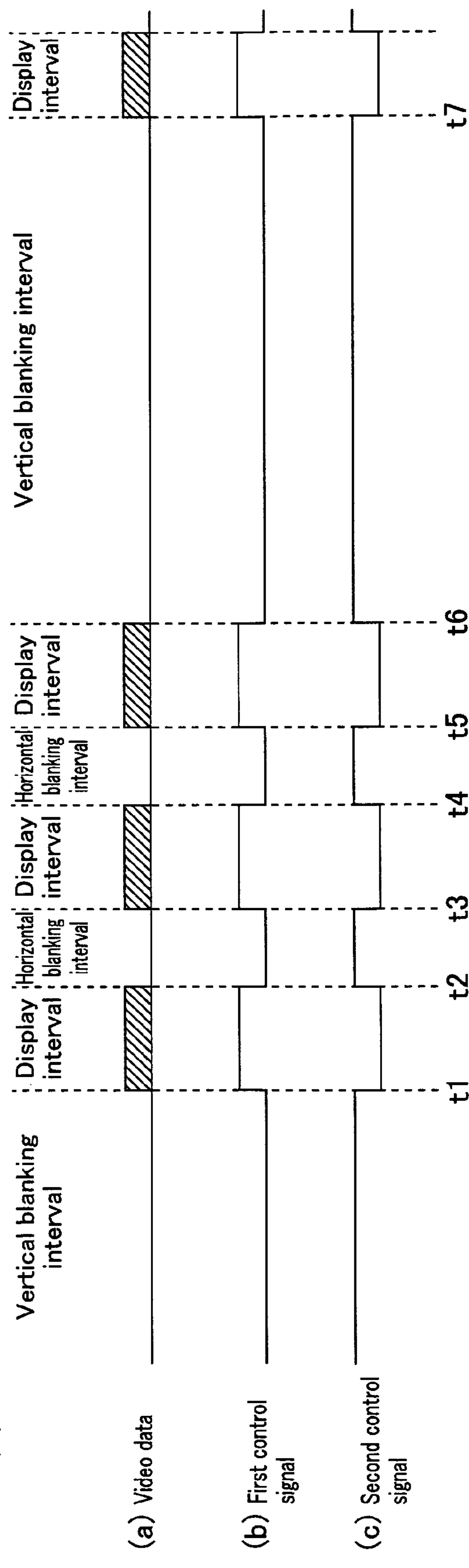
FIG. 1(*a*) is a timing diagram of a method of the present invention for transferring video correction data.
Figure 1:
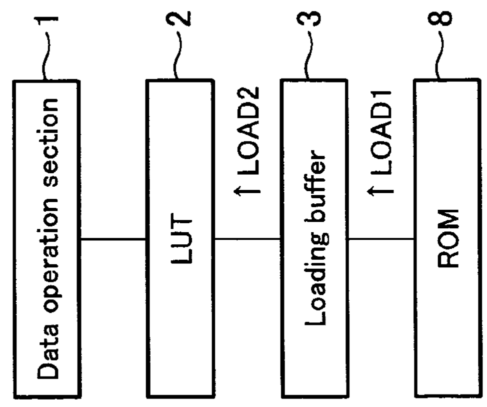

<Schematic Description of Liquid Crystal Display Apparatus>

The following will describe one embodiment of the present invention with reference to the figures.

In various display methods for a liquid crystal display apparatus of the present embodiment, an active-matrix method utilizing TFT (Thin Film Transistor) as a switching element is known as a method for high-definition display.

As shown in FIG. 4, an active-matrix liquid crystal display apparatus 20 comprises a liquid crystal display section 11 and a liquid crystal driving circuit 12 which drives the liquid crystal display section 11.

The liquid crystal display section 11 comprises a liquid crystal panel 13 of a TFT type. The liquid crystal panel 13 includes pixels (not shown) which are arranged in matrix of, for instance, 1024×768 dots (XGA). The liquid crystal panel 13 displays images by vertically performing the display operation on each horizontal scanning line sequentially or intermittently based on image data. The number of horizontal scanning lines of the XGA is 768 in total. Each horizontal scanning line has 1024 dots. The display apparatus of the present invention may have any number of pixels according to need, such as standards 1280×1024 dots (SXGA), 1600×1200 dots (UXGA), 3200×2400 dots (2.7 p/J) and the like.

The liquid crystal driving circuit 12 comprises a plurality of source drivers 14 and a plurality of gate drivers 15 both of which are formed of ICs: integrated circuits, a control circuit 10, a power supply circuit 16, and a ROM 8.

The control circuit 10 processes an input data signal inputted therein externally, thereby to generate an output data signal. The control circuit 10 also generates liquid crystal driving control signals such as a horizontal synchronization signals (latch signal), a vertical synchronization signal (start pulse signal), and the like.

The control circuit 10 outputs the generated output data signal and the horizontal synchronization signal to the source driver 14 and, at the same time, outputs the generated vertical synchronization signal to the gate driver 15. The power supply circuit 16 drives the source drivers 14 and the gate drivers 15.

The source driver 14 comprising a shift register, a D/A converter, a latching circuit, and the like (not shown) receives the output data signal from the control circuit 10 and outputs the output data signal as analog images to the source line (not shown) of the liquid crystal panel 13 based on a control signal such as the horizontal synchronization signal from the control circuit 10.

The gate driver 15 comprising a sift register, a buffer, and the like provides a signal to the gate line (not shown) of the liquid crystal panel 13 based on a control signal such as the vertical synchronization signal from the control circuit 10. Thereby, the liquid crystal panel 13 is driven to display images.

<Arrangement of Control Circuit, Etc.>

The following describes the ROM 8 and a structure of the control circuit 10. A combination of the control circuit 10 and the ROM 8 is referred to as a video signal processing apparatus.

Figure 3:
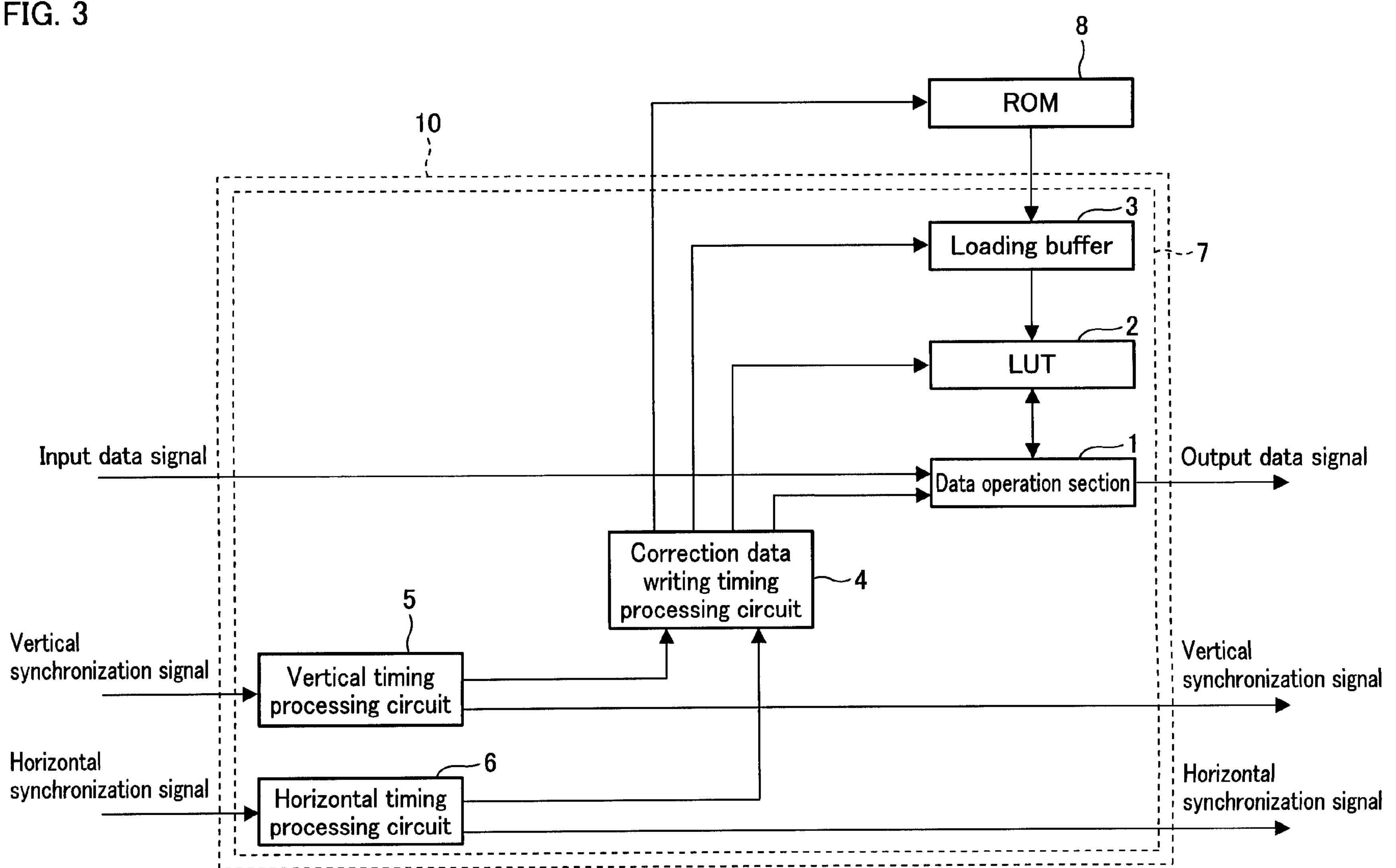
FIG. 3 is a block diagram of an internal configuration of a control circuit and a ROM.

As shown in FIG. 3, the control circuit 10 comprises a data operation section (data processing section) 1, a lookup table (LUT) 2, a loading buffer (buffer) 3, a correction data writing timing processing circuit (processing circuit; controller) 4, a vertical timing processing circuit 5, and a horizontal timing processing circuit 6. The data operation section 1, the LUT 2, the buffer 3, the correction data writing timing processing circuit 4, the vertical timing processing circuit 5, and the horizontal timing processing circuit 6 are included in one ASIC (Application Specific Integrated Circuit; integrated circuit) 7.

The data operation section 1 accesses the LUT 2 in order to obtain video correction data (correction value) for the input data signal inputted therein externally. The input data signal is corrected through data correction such as gamma correction based on the video correction data stored in the LUT 2. Subsequently the input data signal is outputted as the output data signal.

The LUT 2 is a RAM storing the video correction data. The LUT 2 loads the video correction data from the ROM 8 after power-on because the stored video correction data in the LUT 2 is lost upon power-off.

The buffer 3 loads in segmented video correction data transferred from the ROM 8 and temporarily stores the data therein. Then, the stored data is transferred to the LUT 2 all together.

Based on the vertical synchronization signal inputted therein externally, the vertical timing circuit 5 generates various (control) signals such as control signals of the data operation section 1, the LUT 2, the buffer 3, and the ROM 8, the vertical synchronization signal for the liquid crystal driving circuit 12, and the other signals. Similarly, based on the horizontal synchronization signal inputted therein externally, the horizontal timing circuit 6 generates various (control) signals such as control signals of the data operation section 1, the LUT 2, the buffer 3, and the ROM 8, the horizontal synchronization signal to the liquid crystal driving circuit 12, and the other signals.

The processing circuit 4 generates control signals for the data transfers between the ROM 8 and the buffer 3, the buffer 3 and the LUT 2, and the LUT 2 and the data operation section 1.

The ROM 8 is exteriorly connected to the control circuit 10. The video correction data which is identical to the video correction data stored in the LUT 2 is stored in the ROM 8 in advance.

<Timing of Transfer; Video Signal Processing Method>

The most important part of the present invention, a method (timing) for transferring the video correction data from the ROM 8 to the buffer 3 and from the buffer 3 to the LUT 2 is described below with reference to the timing diagram of FIG. 1(*a*) and the block diagram of FIG. 1(*b*).

As described above, the video correction data which is identical to the data stored in the LUT 2 is stored in the ROM 8 in advance. Methods for writing the video correction data into the ROM 8 are not limited. That is, any interface can be utilized in order to write the data into the ROM 8.

As described above, the LUT 2 is built in the ASIC 7. Therefore, the video correction data stored in the LUT 2 would be destroyed due to noise due to static electricity, etc. With such destroyed data in the LUT 2, the data processing cannot be performed as intended. In order to avoid the problem, the video correction data stored in the ROM 8 is transferred to the LUT 2 in order to update (refresh) the video correction data in the LUT 2.

In the timing diagram of FIG. 1(*a*), the waveform (a) indicates the display intervals of the video correction data (and video data) and the blanking intervals (the horizontal blanking intervals and the vertical blanking intervals). The waveform (b) indicates the data transfer (LOAD 1) between the ROM 8 and the buffer 3. The waveform (c) indicates the data transfer (LOAD 2) between the buffer 3 and the LUT 2.

As the waveform (a) indicates, the data operation section 1 communicates with the LUT 2 for video data correction. The corrected video correction data is displayed on the liquid crystal display section 11 through the data operation section 1. That is, the access from the data operation section 1 to the LUT 2 is on. Such intervals for image display are the display intervals. The rest of the display intervals are the blanking intervals. During the blanking intervals, the access from the data operation section 1 to the LUT 2 is off. The blanking intervals and display intervals are repeated alternatively.

As the waveform (b) indicates, the control signal between the ROM 8 and the buffer 3 (first LOAD control signal; first control signal) is at 'L' level during the vertical blanking intervals and the horizontal blanking intervals while the control signal is at 'H' level during the display intervals. In contrast, as the waveform (c) indicates, the control signal between the buffer 3 and the LUT 2 (second LOAD control signal; first control signal) is at 'H' level during the vertical blanking intervals and the horizontal blanking intervals while the control signal is at 'L' level during the display intervals.

In FIG. 1(*a*), time t1-t2, t3-t4, and t5-t6 are the display intervals. Time t2-t3 and t4-t5 are the horizontal blanking intervals. Time t6-t7 is a vertical blanking interval.

More specifically, as the waveform (a) indicates, shifting the vertical blanking interval to the display interval at the time t1 occurs. The access from the data operation section 1 to the LUT 2 is turned on upon shifting the vertical blanking interval to the display interval at the time t1. At this point, as the waveform (b) indicates, the first LOAD control signal rises to 'H' level while the second LOAD control signal falls to 'L' level as the waveform (c) indicates. At the time t2, as the waveform (a) indicates, shifting the display interval to the horizontal blanking interval occurs. The access from the data operation section 1 to the LUT 2 is turned off upon shifting the display interval to the horizontal blanking interval. At this point, as the waveform (b) indicates, the first LOAD control signal falls to 'L' level while the second LOAD control signal rises to 'H' level as the waveform (c) indicates.

At the time t3, as the waveform (a) indicates, shifting the horizontal blanking interval to the display interval occurs. The access from the data operation section 1 to the LUT 2 is turned on upon shifting the horizontal blanking interval to the display interval. At this point, as the waveform (b) indicates, the first LOAD control signal rises to 'H' level while the second LOAD control signal falls to 'L' level as the waveform (c) indicates. At the time t4, as the waveform (a) indicates, shifting the display interval to the horizontal blanking interval occurs. The access from the data operation section 1 to the LUT 2 is turned off upon shifting the display interval to the horizontal blanking interval. At this point, as the waveform (b) indicates, the first LOAD control signal falls to 'L' level while the second LOAD control signal rises to 'H' level as the waveform (c) indicates.

At the time t5, as the waveform (a) indicates, shifting the horizontal blanking interval to the display interval occurs. The access from the data operation section 1 to the LUT 2 is turned on upon shifting the horizontal blanking interval to the display interval. At this point, as the waveform (b) indicates, the first LOAD control signal rises to 'H' level while the second LOAD control signal falls to 'L' level as the waveform (c) indicates. At the time t6, as the waveform (a) indicates, shifting the display interval to the vertical blanking interval occurs. The access from the data operation section 1 to the LUT 2 is turned off upon shifting the display interval to the vertical blanking interval. At this point, as the waveform (b) indicates, the first LOAD control signal falls to 'L' level while the second LOAD control signal rises to 'H' level as the waveform (c) indicates. The time t7 is the same as the time t1 and thus, the description thereof is omitted here.

FIG. 2 is the timing diagram illustrating the timing diagram of FIG. 1(*a*) in further details.

A vertical blanking interval occurs according to an inputted vertical synchronization signal. In the periods out of the vertical blanking intervals, a display interval occurs between a rise and a fall of the horizontal blanking signal. The horizontal blanking intervals occur between the display intervals. The waveform (c) represents the vertical synchronization signal. The waveform (d) represents the horizontal synchronization signal.

As shown in FIG. 2, a cycle also called 1V period undergoing intervals: the vertical blanking interval→the display interval the horizontal blanking interval→the display interval the horizontal blanking interval→ . . . the display interval, is repeated.

During the vertical blanking intervals, the control signal between the buffer 3 and the LUT 2 (the second LOAD control signal) is at 'H' level as the waveform (h) indicates. When the control signal between the buffer 3 and the LUT 2 (the second LOAD control signal) is at 'H' level, the video correction data stored in the buffer 3 is transferred to the LUT 2 as indicated by the waveform (i).

In the vertical blanking intervals, as the waveform (f) indicates, the control signal between the ROM 8 and the buffer 3 (the first LOAD control signal) is at 'L' level. As the waveform (g) indicates, the video correction data is not transferred from the ROM 8 to the buffer 3 when the control signal between the ROM 8 and the buffer 3 (the first LOAD control signal) is at 'L' level. In addition, there is no communication between the LUT 2 and the data operation section 1 during the vertical blanking intervals.

During the display intervals, the video data in the data operation section 1 is corrected through the communication between the LUT 2 and the data operation section 1. The first LOAD control signal is at 'H' level as the waveform (f) indicates. As the waveform (g) indicates, the video correction data is transferred from the ROM 8 to the buffer 3 and temporarily stored therein when the first LOAD control signal is at 'H' level as the waveform (f) indicates. Furthermore, the second LOAD control signal is at 'L' level as the waveform (h) indicates during the display intervals. As the waveform (i) indicates, the video correction data is not transferred from the buffer 3 to the LUT 2 when the second LOAD control signal is at 'L' level as the waveform (h) indicates during the display intervals.

During the horizontal blanking intervals, the second LOAD control signal between the buffer 3 and the LUT 2 is at 'H' level as the waveform (h) indicates. As the waveform (i) indicates, the video correction data stored in the buffer 3 is transferred to the LUT 2 when the second LOAD control signal between the buffer 3 and the LUT 2 is at 'H' level as the waveform (h) indicates. In contrast, the first LOAD control signal between the ROM 8 and the buffer 3 is at 'L' as the waveform (f) indicates during the horizontal blanking intervals. As the waveform (g) indicates, the video correction data is not transferred from the ROM 8 to the buffer 3 when the first LOAD control signal between the ROM 8 and the buffer 3 is at 'L' as the waveform (f) indicates during the horizontal blanking intervals. There is no communication between the LUT 2 and the data operation section 1 during the horizontal blanking intervals.

More specifically, as the waveform (f) indicates, the first LOAD control signal rises to 'H' level at the time t1. As the waveform (g) indicates, the video correction data is transferred from the ROM 8 to the buffer 3 and temporarily stored therein during the display interval between time t1 and t2. At the time t2, as the waveform (h) indicates, the second LOAD control signal rises to 'H' level. As the waveform (i) indicates, the video correction data stored in the buffer 3 is transferred to the LUT 2 during the horizontal blanking interval between the time t2 and t3.

At the time t3, the first LOAD control signal rises to 'H' level as the waveform (f) indicates. As the waveform (g) indicates, the video correction data is transferred from the ROM 8 to the buffer 3 and temporarily stored therein during the display interval between the time t3 and t4. At the time t4, the second LOAD control signal rises to 'H' level as the waveform (h) indicates. During the horizontal blanking interval between the time t4 and t5, the video correction data stored in the buffer 3 is transferred to the LUT 2 as the waveform (i) indicates.

At the time t5, the first LOAD control signal rises to 'H' level as the waveform (f) indicates. During the display interval between the time t5 and t6, the video correction data is transferred from the ROM 8 to the buffer 3 and temporarily stored therein as the waveform (g) indicates. At the time t6, the second LOAD control signal rises to 'H' level as the waveform (h) indicates. During the vertical blanking interval between the time t6 and t7, the video correction data stored in the buffer 3 is transferred to the LUT 2 as the waveform (i) indicates.

As described above, the method for updating the video correction data of the present embodiment is arranged such that the data stored in the buffer 3 is transferred to the LUT 2 during the horizontal blanking intervals. That is, the data in the LUT 2 is updated during every horizontal blanking interval. Therefore, the method of the present embodiment realizes more frequent updates than updates during every vertical blanking interval. Moreover, updates to the LUT 2 are carried out not only during the horizontal blanking intervals, but also during the vertical blanking intervals. This realizes transfer of a greater data amount in one cycle described above.

The ROM 8 is located outside the ASIC 7 in the liquid crystal display apparatus 20 of the present embodiment. As a result, the direct transfer of the video correction data from the ROM 8 to the LUT 2 is slow. In addition, the LUT 2 cannot simultaneously access both the ROM 8 and the data operation section 1. Therefore, the data transfer of the video correction data from the ROM 8 to the LUT 2 is possible only during intervals (blanking intervals) in which the LUT 2 does not communicate with the data operation section 1.

As a solution, the buffer 3 is provided in the ASIC 7 in the present embodiment. With this arrangement, it becomes possible that the video correction data stored in the ROM 8 is transferred to the buffer 3 during the display intervals in which the LUT 2 communicates with the data operation section 1. The data stored in the buffer 3 is subsequently transferred to the LUT 2 during the blanking intervals. The video correction data stored in the buffer 3 is transferred to the LUT 2 at the clock frequency of the ASIC 7 because the buffer 3 is located within the ASIC 7. Consequently, a faster updating can be realized.

As noted, the ROM 8 is located outside the ASIC 7 in the present embodiment. As a result it is possible to reduce the number of gates in the ASIC 7. With the arrangement in which the LUT 2-built-in ASIC 7 without extra configuration, and the external ROM 8 are provided, it is possible to have a ASIC 7 having the same configuration. This makes it possible to reduce the number of kinds of components.

Circuitry and the process of manufacture of ASIC 7 become simple because the ROM 8 is located outside the ASIC 7. Moreover, the video correction data stored in the ROM 8 is unlikely changed by the noise due to static electricity, etc. because the ROM 8 is located outside the ASIC 7. Also, by the utilization of ROM 8, the video correction data stored in the ROM 8 is not likely changed by the noise due to static electricity, etc.

In the arrangement described above, as the waveform (i) in FIG. 2 indicates, the video correction data stored in the buffer 3 is transferred to the LUT 2 during all the vertical blanking intervals (t6-t7) and the horizontal blanking intervals (t2-t3, t4-t5).

However, it is not always necessary to transfer the video correction data stored in the buffer 3 to the LUT 2 during the vertical blanking intervals.

Also, it is not always necessary to transfer the video correction data stored in the buffer 3 to the LUT 2 during all the horizontal blanking intervals. The data transfer of the video correction data during at least one horizontal blanking interval may be carried out. The data transfer of the video correction data during at least one part of the horizontal blanking interval may also be carried out.

In the arrangement described above, as the waveform (g) in FIG. 2 indicates, the video correction data is transferred from the ROM 8 to the buffer 3 only during the display intervals (t1-t2, t3-t4, and t5-t6). However, it may be arranged such that the data transfer of the video correction data not only during the display intervals, but also during the horizontal blanking intervals and/or the vertical blanking intervals.

Figure 5:
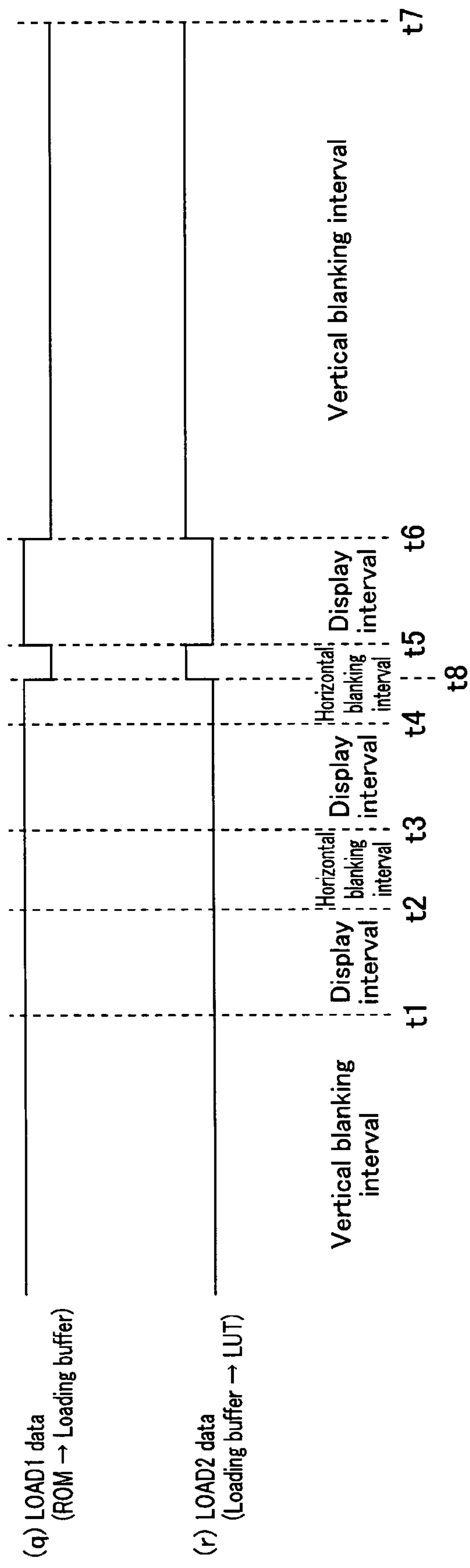
FIG. 5 is a timing diagram of a modification of the timing diagram FIG. 2.

That is, it may be arranged such that the video correction data from the ROM 8 to the buffer 3 is transferred during those periods of the vertical blanking intervals and/or the horizontal blanking intervals in which the data transfer of the video correction data from the buffer 3 to the LUT 2 does not occur. An embodiment arranged as such is described below with reference to FIG. 5. For easy explanation, this embodiment is described referring to only the waveforms (q) and (r) that respectively correspond to the waveforms (g) and (i) in FIG. 2.

The time symbols t1-t7 are common between FIG. 2.

It may be arranged such that during the period from the time t1 to t8 (n.b. t4<t8<t5), the video correction data is transferred from the ROM 8 to the buffer 3 as the waveform (q) indicates, and subsequently the data is transferred from the buffer 3 to the LUT 2 as the waveform (r) indicates during the period from the time t8 to t5, which is a part of the vertical blanking interval. The description for the rest intervals is omitted here, because they are same as in FIG. 2.

While the above arrangements are provided with the ROM 8, it is not essential for the present invention to have the ROM 8. The present invention may be provided with a RAM or an EEPROM.

Because the ROM 8 is not rewritable, every liquid crystal display apparatus 20 requiring different video data correction needs a ROM 8 having corresponding video correction data. Therefore, each different type of the liquid crystal display apparatus 20 need a different ROM 8.

However, the use of a rewritable EEPROM instead of the ROM 8 makes it possible to externally rewriting the values of the correction and can cope with any different type of the liquid crystal display apparatus 20. This enables sharing the EEPROM as a common component among different types of the liquid crystal display apparatus 20. Similarly, the use of a RAM instead of the ROM 8 allows rewriting more than once.

As described above, the ROM 8 is located outside the control circuit 10. The ROM 8 is also located outside the ASIC 7.

However, the arrangement that the ROM 8 is located within the ASIC 7 is possible. In case the RAM is utilized instead of the ROM 8 and located within the ASIC 7, prevention against the change of the video correction data in the RAM due to static electricity within the ASIC 7 or the other causes is necessary. Accordingly, the RAM needs to be more stable against noise due to static electricity, etc. than at least the LUT 2.

The buffer 3 is not essential. A method (timing) for transferring the video correction data from a ROM 8 to a LUT 2 without using the buffer 3 is described below with reference to the timing diagram of FIG. 6(*a*) and the block diagram of FIG. 6(*b*).

Figure 6:
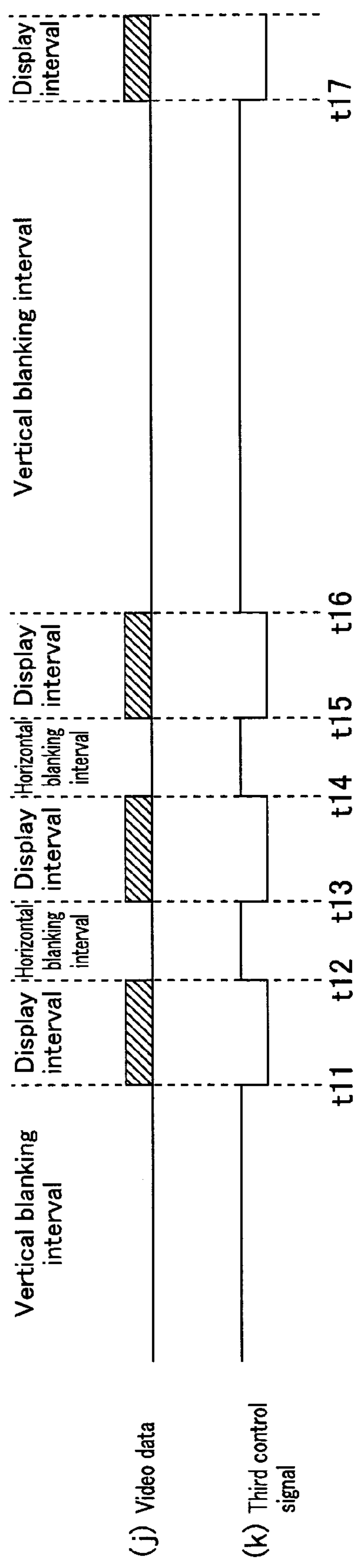
FIG. 6(*a*) is a timing diagram of a method for transferring video correction data, the method being identical with that in FIG. 1(*a*) except that a loading buffer is not included therein.
Figure 6:
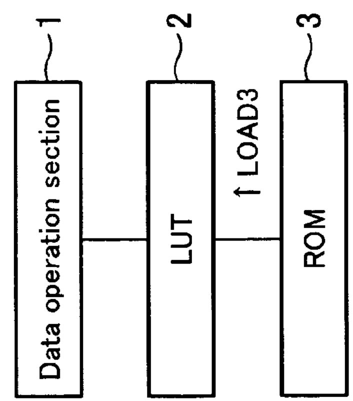

In FIG. 6(*a*), the waveform (j) is the same as the waveform (a) in FIG. 1(*a*). The waveform (k) represents the data transfer between the ROM 8 and the LUT 2 (LOAD3).

As the waveform (k) indicates, the control signal between the ROM 8 and the LUT 2 (the third control signal) is at 'H' level during the vertical blanking intervals and the horizontal blanking intervals while the control signal is at 'L' level during the display intervals.

In FIG. 6(*a*), time t1-t12, t13-t14, and t15-t16 are the display intervals. Time t12-t13 and t14-t15 are the horizontal blanking intervals. Time t16-t17 is a vertical blanking interval.

What is carried out in this embodiment is described temporally. At the time t11, the access from the data operation section 1 to the LUT 2 is turned on upon shifting the vertical blanking interval to the display interval as the waveform (j) indicates. At this point, as the waveform (k) indicates, the third control signal falls to 'L' level. At the time t12, as the waveform (j) indicates, the access from the data operation section 1 to the LUT 2 is turned off upon shifting the display interval to the horizontal blanking interval. At this point, as the waveform (k) indicates, the third control signal rises to 'H' level. At the time t13, as the waveform (j) indicates, the access from the data operation section 1 to the LUT 2 is turned on upon shifting the horizontal blanking interval to the display interval. At this point, as the waveform (k) indicates, the third control signal falls to 'L' level. At the time t14, as the waveform (j) indicates, the access from the data operation section 1 to the LUT 2 is turned off upon switching the display interval to the horizontal blanking interval. At this point, as the waveform (k) indicates, the third control signal rises to 'H' level. At the time t15, as the waveform (j) indicates, the access from the data operation section 1 to the LUT 2 is turned on upon shifting the horizontal blanking interval to the display interval. At this point, as the waveform (k) indicates, the third control signal falls to 'L' level. At the time t16, as the waveform (j) indicates, the access from the data operation section 1 to the LUT 2 is turned off upon shifting the display interval to the vertical blanking interval. At this point, as the waveform (k) indicates, the third control signal rises to 'H' level. At the time t17, as the waveform (j) indicates, the access from the data operation section 1 to the LUT 2 is turned on upon shifting the vertical blanking interval to the display interval. At this point, as the waveform (k) indicates, the third control signal falls to 'L' level.

Figure 7:
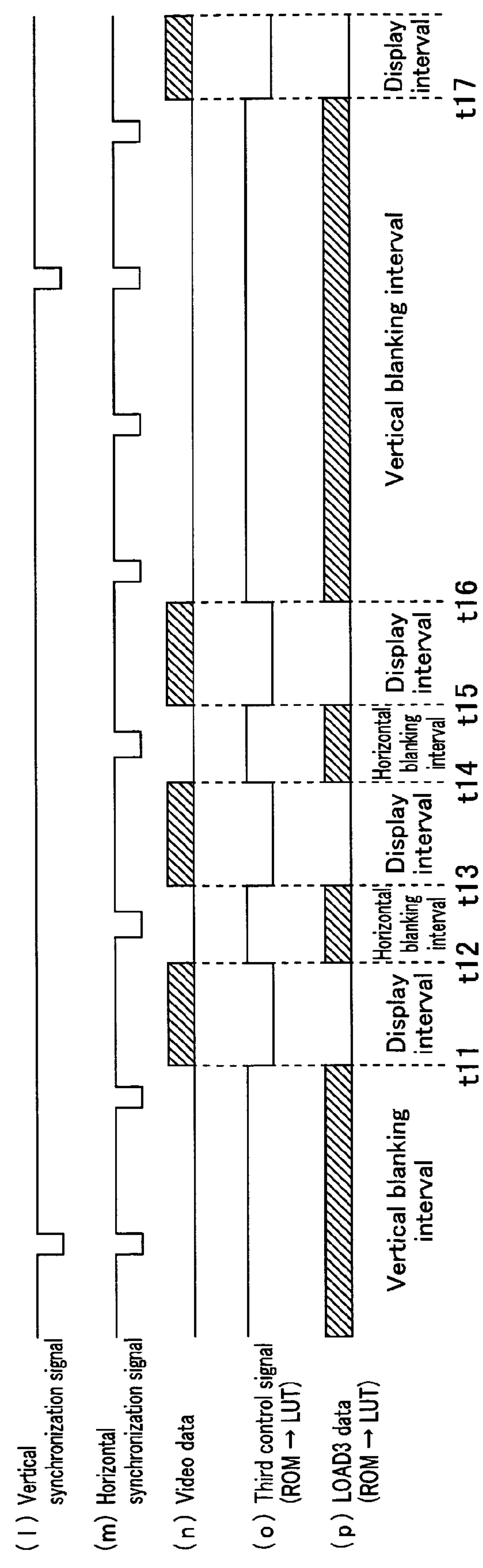
FIG. 7 is a timing diagram identical with that of FIG. 2 except that the loading buffer is not included therein.

FIG. 7 is a further detailed timing diagram of the timing diagram of FIG. 6(*a*).

The waveforms (l) and (m) are respectively corresponding to the waveforms (c) and (d) in FIG. 2.

During the vertical blanking intervals, the third control signal between the ROM 8 and the LUT 2 is at 'H' level as the waveform (o) indicates. The video correction data is transferred from the ROM 8 to the LUT 2 as the waveform (p) indicates when the third control signal between the ROM 8 and the LUT 2 is at 'H' level as the waveform (o) indicates. There is no communication between the LUT 2 and the data operation section 1 during the vertical blanking intervals.

During the display intervals, the video data stored in the data operation section 1 is corrected through the communication between the LUT 2 and the data operation section 1. The third control signal is at 'L' level as the waveform (o) indicates during the display intervals As the waveform (p) indicates, the video data is not transferred from the ROM 8 to the LUT 2 when the third control signal is at 'L' level as the waveform (o) indicates during the display intervals.

During the horizontal blanking intervals, the third control signal is at 'H' level as the waveform (o) indicates. The video correction data is transferred from the ROM 8 to the LUT 2 as the waveform (p) indicates when the third control signal is at 'H' level as the waveform (o) indicates. There is no communication between the LUT 2 and the data operation section 1 during the horizontal blanking intervals.

More specifically, at the time t11, the third control signal falls to 'L' level as the waveform (o) indicates. Therefore, as the waveform (p) indicates, the video correction data is not transferred from the ROM 8 to the LUT 2 during the display interval between time t11 and t12. At the time t12, the third control signal rises to 'H' level as the waveform (o) indicates. Accordingly, the video correction data is transferred from the ROM 8 to the LUT 2 during the horizontal blanking interval between the time t12 and t13 as the waveform (p) indicates. At the time t13, the third control signal falls to 'L' level as the waveform (o) indicates. Therefore, as the waveform (p) indicates, the video correction data is not transferred from the ROM 8 to the LUT 2 during the display interval between the time t13 and t14.

At the time t14, the third control signal rises to 'H' level as the waveform (o) indicates. Therefore, as the waveform (p) indicates, the video correction data is transferred from the ROM 8 to the LUT 2 during the horizontal blanking interval between the time 14 and t15. At the time t15, as the waveform (o) indicates, the third control signal falls to 'L' level. Therefore, as the waveform (p) indicates, the video correction data is not transferred from the ROM 8 to the LUT 2 during the display interval between the time t15 and t16. At the time t16, as the waveform (o) indicates, the third control signal rises to 'H' level. Accordingly, as the waveform (p) indicates, the video correction data is transferred from the ROM 8 to the LUT 2 during the vertical blanking interval between the time t16 and t17.

In FIG. 1(*b*), the transfer rate of the video correction data from the ROM 8 to the buffer 3 is, for instance, 400 kHz. The transfer rate of the video correction data from the buffer 3 to the LUT 2 is, for instance, 65 MHz.

Any display apparatus such as an organic EL (electroluminescence) display apparatus instead of the liquid crystal display apparatus 20 may be adopted.

Referential Example

A Referential Example according to the embodiment above in FIG. 1(*a*) is briefly described below with reference to FIG. 8.

Figure 8:
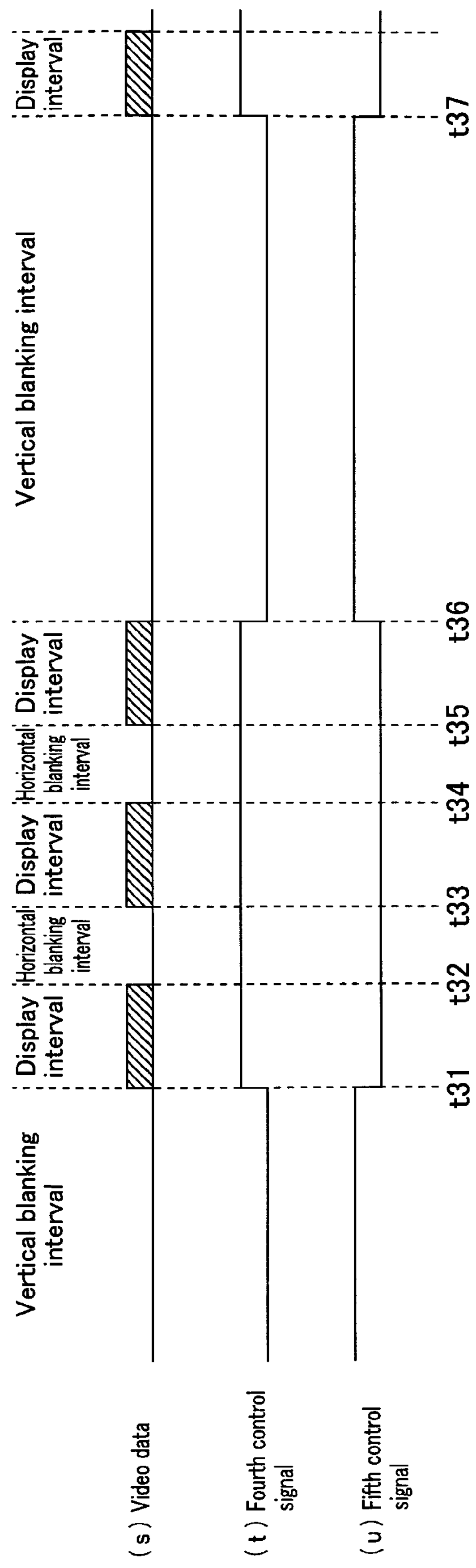
FIG. 8 is a timing diagram of a method for transferring video correction data in a referential example.
Figure 9:
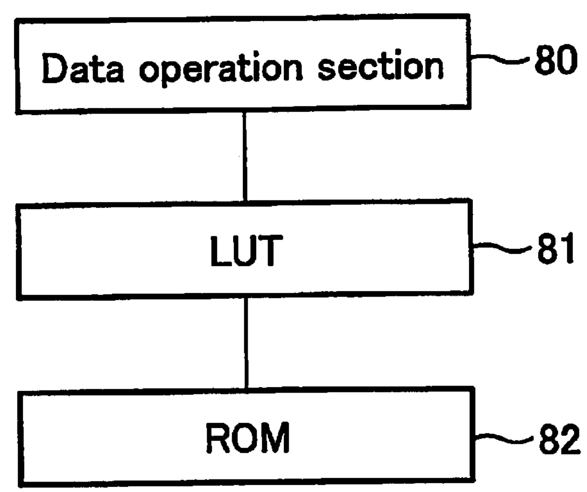
FIG. 9 is a block diagram of a data operation section, an LUT, and a ROM in a conventional method.
Figure 10:
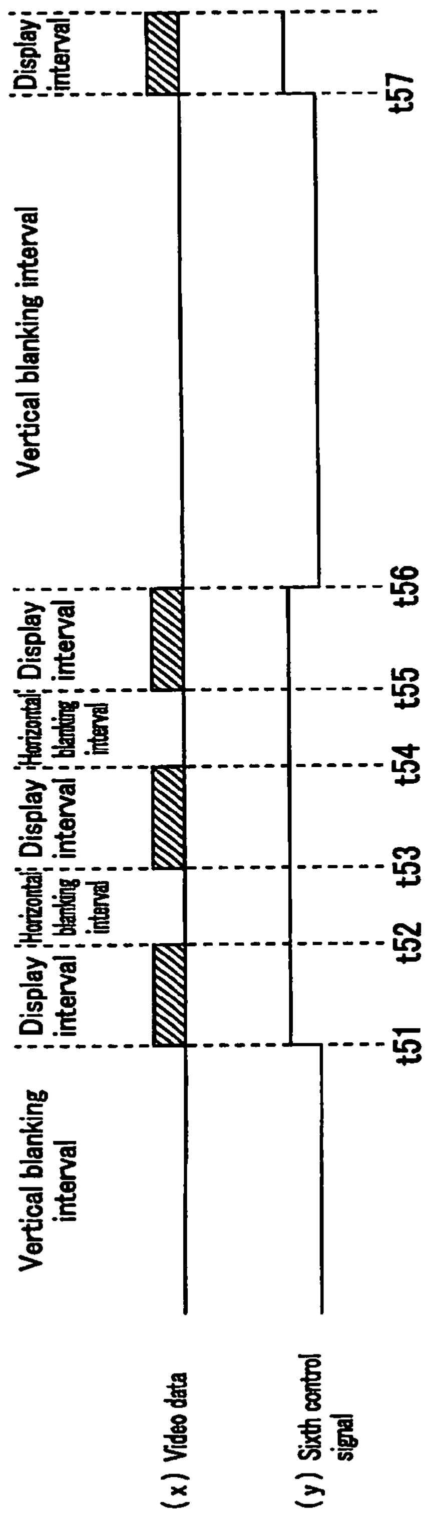
FIG. 10 is a timing diagram of a conventional method for transferring video data.

In FIG. 8, time t31-t32, t33-t34, and t35-36 are the display intervals. Time t32-t33 and t34-t35 are the horizontal blanking intervals. Time t36-t37 is a vertical blanking interval.

The waveform (s) represents the display intervals and the blanking intervals (the horizontal blanking intervals and the vertical blanking intervals). The waveform (t) represents the data transfer from a ROM to a buffer. The waveform (u) represents the data transfer from the buffer to a LUT.

As the waveform (t) indicates, the fourth control signal between the ROM and the buffer is at 'H' level during the display intervals and the horizontal blanking intervals while the control signal is at 'L' level during the vertical blanking intervals. As the waveform (u) indicates, the fifth control signal between the buffer and the LUT is at 'L' level during the display intervals and the horizontal blanking intervals while the control signal is at 'H' level during the vertical blanking intervals. That is to say, the video correction data stored in the LUT is updated only during the vertical blanking intervals in the present reference.

The video signal processing method and the video signal processing apparatus of the present invention is preferably arranged such that also during a vertical blanking interval, the updating video correction data stored in the lookup table is carried out.

In the configuration above, the video correction data in the lookup table is updated also during the vertical blanking intervals. That is to say, the video correction data stored in the lookup table is updated during both of the horizontal blanking intervals and the vertical blanking intervals. Therefore, the amount of video correction data during one cycle between the vertical blanking intervals increases. Thus, the updating is carried out in a shorter cycle. As a result, the shortened update cycle realizes quicker restoration of the video correction data in the lookup table.

Moreover, the video signal processing method of the present invention is preferable arranged to comprise: during at least a display interval, temporarily storing in a loading buffer the video correction data received from the storage section; the loading buffer being provided between the lookup table and the storage section; and transferring to the lookup table the video correction data stored in the loading buffer, so as to perform updating the video correction data stored in the lookup table.

Moreover, the video signal processing apparatus of the present invention is preferably arranged that it comprises: a loading buffer between the lookup table and the storing section, and that during at least a display interval, the controlling section temporarily stores in the loading buffer the video correction data received from the storage section, and the updating of the video correction data stored in the lookup table is carried out by transferring the video correction data stored in the loading buffer to the lookup table.

In the arrangements the loading buffer is located between the lookup table and the storage section. The video correction data stored in the storage section is not directory transferred to the lookup table, but is temporarily stored in the loading buffer, and subsequently transferred to the lookup table. As a result, faster transfer of the video correction data to the lookup table is realized. Frequent small data transfer during the horizontal blanking intervals allows to use a lower-capacity loading buffer than in an arrangement in which the data transfer is carried in bulk during the vertical blanking intervals. Thus, the miniaturization of the loading buffer is achieved.

The video signal processing method and the video signal processing apparatus of the present invention are preferably arranged such that the storing the video correction data from the storage section in the loading buffer is carried out during the display interval of the video signal except the vertical blanking interval and the horizontal blanking interval.

In the arrangement above, the video correction data is stored in the loading buffer from the storage section during the display intervals of the video signals except the vertical blanking intervals and the horizontal blanking intervals. In short, the video correction data from the storage section is stored in the loading buffer during the display intervals. Accordingly, the video correction data is effectively transferred from the loading buffer to the lookup table during the vertical blanking intervals and the horizontal blanking intervals.

In the video signal processing apparatus of the present invention, it is preferable that the loading buffer be provided in one integrated circuit including the data processing section and the lookup table.

According to the structure above, the loading buffer and the lookup table is located on one integrated circuit. As a result, the video correction data is transferred from the loading buffer to the lookup table at the clock frequency of the integrated circuit. Accordingly, further faster transfer of the video correction data to the lookup table is realized.

In the video signal processing apparatus of the present invention, it is preferable that the storing section be provided outside the integrated circuit including the data processing section and the lookup table.

According to the structure above, the number of gates of the integrated circuit can be reduced. In addition, integrated circuits, which include the lookup table and have a common configuration can be utilized without taking the storage section into consideration.

In the video signal processing apparatus of the present invention, the storage section is preferably a ROM.

According to the arrangement above, the stored video correction data is not easily destroyed due to noise due to static electricity, etc. because the storage section is a ROM.

In the video signal processing apparatus, the storage section is preferably an EEPROM.

In the arrangement above, the storage section is an EEPROM. As a result, the storage section is applicable to the display apparatus having different features because the video correction data is rewritable. This enables use a common component among different display apparatuses.

The display apparatus of the present invention preferably includes any of the video signal processing apparatuses described above.

As described above, a video signal processing method of the present invention is video signal processing method including reading out image correction data from a storage section, storing the image correction data in a lookup table, and performing data correction of image signal with the image correction data stored in the lookup table, the image signal being inputted externally, the video signal processing method comprising: during a horizontal blanking interval of the video signal, updating the video correction data stored in the lookup table.

As described above, a video signal processing apparatus of the present invention is arranged such that it comprises a storage section for storing video correction data for data correction of an input video signal inputted in the video signal processing apparatus externally; a lookup table for storing the video correction data transferred from the storage section; a data processing section for correcting the input video signal by using the video correction data stored in the lookup table; and a controlling section for updating, during a horizontal blanking interval of the video signal, the video correction data stored in the lookup table. With this arrangement, it is possible to update the video correction data in the lookup table sufficiently.

For instance, the video signal processing method of the present invention may further comprises: also during a vertical blanking interval, updating video correction data stored in the lookup table.

In addition, the video signal processing apparatus of the present invention may be further arranged such that it comprises a loading buffer between the lookup table and the storing section, and that during at least a display interval, the controlling section temporarily stores in the loading buffer the video correction data received from the storage section, and the updating of the video correction data stored in the lookup table is carried out by transferring the video correction data stored in the loading buffer to the lookup table.

According to the exemplified video signal processing method and the video signal processing apparatus, Frequent small data transfer during the horizontal blanking intervals allows to use a lower-capacity loading buffer than in an arrangement in which the data transfer is carried in bulk during the vertical blanking intervals. Thus, the miniaturization of the loading buffer is achieved. The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

A method for a processing video signal and a video processing apparatus of the present invention are suitably applicable especially to display apparatus such as liquid crystal display apparatus.

The invention claimed is:

1. A video signal processing method including reading out image correction data from a storage section, storing the image correction data in a lookup table, and performing data correction of a video-signal with the image correction data stored in the lookup table, the video-signal being inputted externally, the video signal processing method comprising:
- first transferring the video correction data from the storage section to a loading buffer during a display interval of the video signal; and
- updating video correction data stored in the lookup table during a horizontal blanking interval of the video signal, the updating step including,
  - second transferring the video correction data stored in the loading buffer to the lookup table during the horizontal blanking interval such that the video correction data previously stored in the lookup table is updated,
  - wherein the loading buffer and the lookup table are included in a single integrated circuit.

2. The video signal processing method as set forth in claim 1 further comprising:
- also during a vertical blanking interval of the video signal, updating the video correction data stored in the lookup table.

3. The video signal processing method for as set forth in claim 1, wherein the loading buffer being provided between the lookup table and the storage section.

4. A video signal processing apparatus, comprising:

a storage section for storing video correction data for data correction of an input video signal inputted in the video signal processing apparatus externally;

a loading buffer for temporarily storing the video correction data;

a lookup table for storing the video correction data transferred from the-storage section, the loading buffer and the lookup table being included in a single integrated circuit;

a data processing section for the data correction of the video signal by using the video correction data stored in the lookup table; and a controlling section for updating the video correction data stored in the lookup table during a horizontal blanking interval of the video signal, wherein the controlling section first transfers the video correction data from the storage section to the loading buffer during a display interval of the video signal and second transfer the video correction data stored in the loading buffer to the lookup table during the horizontal blanking interval such that the video correction data previously stored in the lookup table is updated.

5. The video signal processing apparatus as set forth in claim 4, wherein also during a vertical blanking interval of the video signal, the updating video correction data stored in the lookup table is carried out.

6. The video signal processing apparatus as set forth in claim 4, wherein the loading buffer is provided between the lookup table and the storing section.

7. The video signal processing apparatus as set forth in claim 6 wherein the loading buffer is provided in one integrated circuit including the data processing section and the lookup table.

8. The video signal processing apparatus as set forth in claim 4 wherein the storing section is provided outside the integrated circuit including the data processing section and the lookup table.

9. The video signal processing apparatus as set forth in claim 4 wherein the storage section is a ROM.

10. The video signal processing apparatus as set forth in claim 4 wherein the storage section is an EEPROM.

11. A display apparatus comprising a video signal processing apparatus as set forth in claim 4.

12. The video signal processing method of claim 1, wherein the first transferring step is based on a first control signal, and the second transferring step is based on a second control signal.

13. The video signal processing apparatus of claim 4, wherein the controlling section first transfers the video correction data based on a first control signal, and the controlling section second transfers the video correction data based on a second control signal.

* * * * *